United States Patent Office

3,054,800
Patented Sept. 18, 1962

3,054,800
3,5-DINITRO-1,2,4-TRIAZOLES AND PROCESS FOR PREPARING SAME
Harry P. Burchfield, Woodbury, Conn., and Delora K. Gullstrom, Lowell, Ind., assignors, by mesne assignments, to the United States of America as represented by the Secretary of the Navy
No Drawing. Filed Sept. 17, 1949, Ser. No. 119,996
7 Claims. (Cl. 260—299)

This invention relates to the new compound 3,5-dinitro 1,2,4-triazoles and process for preparing same. The parent compound can exist in several tautomeric forms among which are:

(a) The un-ionized form

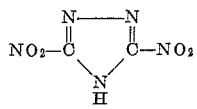

(b) The ionized form

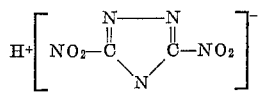

(c) A form tautomeric to (a)

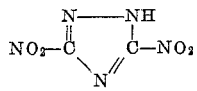

In solution the compound exists primarily in the ionized form (b).

The three principal classes of derivatives that we have made are:

(a) The metallic salts such as the sodium, silver, tetravalent lead, lithium, potassium and calcium salts.

(b) The amine salts such as the pyridine and guanidine salt. The guanidine salt was found to be particularly useful.

(c) The N-alkyl and N-alkenyl derivatives such as the methyl, ethyl, propyl, allkyl and 2,3-dibromo propyl. It is preferred that the alkyl or alkenyl group contain not more than three carbon atoms. The alkyl or alkenyl derivatives are alkylated in either the 1 or the 4 position corresponding to form (a) or (c). Work has not been done to determine which isomer is formed, but the experience is that only one form is obtained.

*Preparation of 3,5-Dinitro-1,2,4-Triazole from Guanizine*

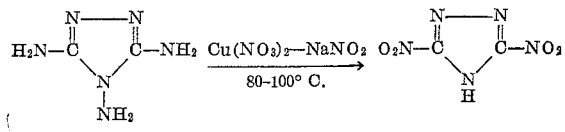

Cupric nitrate trihydrate (150 grams) is dissolved in 900 ml. of 40% aqueous sodium nitrite and heated on a water bath at 80–100° C. Thirty grams of guanazine in 150 ml. of water is then added dropwise with stirring and the mixture heated on the water bath over a period of two hours. The mixture is then filtered and treated with the theoretical amount of silver nitrate to precipitate the dinitrotriazole as the silver salt. After acidification of the solution with nitric acid the precipitate is collected and dried on a filter pump.

Free dinitrotriazole is prepared by suspending the silver salt in moist ether and treating it with gaseous HCl. On filtering off the silver chloride and removing the solvent under vacuum, dinitrotriazole is obtained as a yellow hygroscopic crystal mass. The compound is strongly acidic in nature and readily forms salts and alkyl derivatives.

*Preparation from Guanazole*

Guanazole (3,5-diamino-1,2,4-triazole) can also be used as the intermediate in the preparation of 3,5-dinitro 1,2,4-triazole. However, the product is contaminated with 5-nitrotetrazole since approximately one half of the original triazole is converted to a tetrazole with the elimination of a ring carbon as $CO_2$.

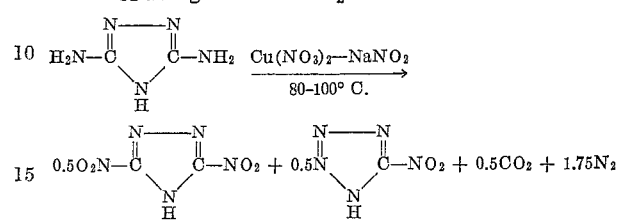

In the case of guanazine only a trace of $CO_2$ is evolved, and the product is substantially pure dinitrotriazole.

*Preparation of Metallic Salts*

The sodium salt is prepared by treatment of an acetone solution of dinitrotriazole with excess sodium bicarbonate. It is soluble in the acetone and is recovered as a yellow crystalline material by evaporation of the solvent.

The tetravalent lead salt of dinitrotriazole is obtained as a while crystalline solid by treatment of an acetone solution of dinitrotriazole with lead peroxide.

An acetone solution prepared by adding acetone to the ethereal solution of the free 3,5-dinitro 1,2,4-triazole obtained above was treated with an excess of lead dioxide. After about half an hour the solution was filtered, and the acetone evaporated on the steam bath. The tetravalent lead salt was obtained as a white crystalline material which explodes vigorously when dropped on a hot plate.

In the preparation of these salts it is customary to estimate the amount of 3,5-dinitro 1,2,4-triazole in the ether solution and then to use a large excess of salt-forming reagent. Due to the explosive nature of the compounds the usual isolations and weighings are avoided.

The silver salt may be recovered in the synthesis from guanazine, described above, or by treating an aqueous solution of 3,5-dinitro 1,2,4-triazole with silver nitrate. The silver salt is unique in that it is the only salt of 3,5-dinitro 1,2,4-triazole that we have found to be water-insoluble. It is also unusual in that it is soluble in acetonitrile.

*Preparation of the Guanidine Salt*

The guanidine salt is obtained as a pale yellow non-hygroscopic solid by treatment of an acetone solution of dinitrotriazole with guanidine carbonate and evaporating the solvent. It melts at 225–228 C. with decomposition and fails to detonate under the impact of a 2 kg. weight dropped from a height of 320 cm. The following analysis was obtained on a purified sample. Percent C: found 16.61, theory 16.51. Percent H: found 2.69, theory 2.75. Percent N: found 50.89, theory 51.40.

*Preparation of the N-Alkyl and N-Alkenyl Derivatives*

1-(or 4)-methyl-3,5-dinitro-1,2,4-triazole is prepared by treatment of the sodium salt with dimethyl sulfate, or the reaction of silver dinitrotriazole with methyl iodide. In the latter preparation the silver salt is dissolved in acetonitrile and treated with excess methyl iodide. The silver iodide that is precipitated is filtered off and the methyl derivative recovered by evaporation of the solvent. On recrystallization from isopropanol, methyl dinitrotriazole is obtained in the form of white crystals melting at 98–98.5° C. Percent C: found 20.31, theory 20.86. Percent H: found 2.00, theory 1.73. Percent N: found 40.19, theory 40.40. The compound detonates when a 2 kg. weight is dropped on a 35 mg. sample from a height of 70 cm. It is stable in vacuum at 120° C.

1-(or 4)-ethyl-3,5-dinitro-1,2,4-triazole is obtained in the form of white crystals melting at 78° C. by reaction of silver dinitrotriazole in acetonitrile solution with ethyl iodide. It cannot be detonated at 320 cm. in the impact sensitivity test.

1-(or 4)-allyl-3,5-dinitro-1,2,4-triazole is prepared by the reaction of allyl bromide with silver dinitrotriazole. It is a white crystalline solid melting at 54–56° C. On treatment with bromine in carbon tetrachloride it yields 1-(or) - (2,3-dibromopropyl) - 3,5 - dinitro-1,2,4-triazole (M.P. 86–88° C.). This compound can be used in further synthesis by replacement of the halogens with explosive groupings.

3,5-dinitro-1,2,4-triazole and its derivatives comprise a new class of explosive materials with valuable physical characteristics. The parent compound has an oxygen balance of −5% and the calculated heat of explosion is enhanced by the presence of heterocylic ring nitrogen. The guanidine salt and the alkyl and alkenyl derivatives are relatively insensitive to impact when compared with explosives such as RDX and tetryl. The low melting points of the alkyl and alkenyl derivatives make them of interest as castable explosives. The presence of an easily replaceable hydrogen in the 3,5-dinitro-1,2,4-triazole molecule renders this material a valuable intermediate for the preparation of new compounds with good physical and explosive properties.

1-(or 4)-methyl-3,5-dinitro-1,2,4-triazole is typical of this class of new explosives. As a pure material the compound in the powder form screened through a standard 30 mesh sieve may be hand taped into a cardboard tube of one inch inside diameter with a wooden pestle to a bulk density of at least 1.0 and packed to a height of 10 inches. This may be then surmounted by a cylindrical booster explosive pellet of, for example, tetryl one inch in diameter and one inch long pressed to a density of 1.55 containing a well ¾ inch deep into which is inserted an Engineer Corps Special electric blasting cap. Upon proper electrical ignition of the latter the entire charge explodes with great violence.

Ordinarily, however, 1 - (or 4) - methyl - 3,5 - dinitro 1,2,4-triazole is cast loaded into containers in explosive devices much as in the same manner as is commonly used for TNT. This method of loading is well known to those skilled in the art. This compound melts at 98° C. and is stable and reasonably safe to handle in the melted state so that it can be poured into a space in an explosive device and allowed to solidify. This technique is extremely useful for irregularly shaped or very large warhead spaces where a pressing technique is almost impossible. Thus a warhead space in an artillery shell of approximately 6″ inside diameter by 18″ deep with a tapered shape near the top may be conveniently filled in this manner. The shell body is pre-heated to the casting temperature 98° C., so that quick solidification on cold walls is avoided. The explosive compound previously melted in a steam heated container is poured into the shell body and the whole allowed to cool slowly by standing for some hours until solidified. A density of the explosive charge of 95% of the crystal density of the pure explosive is obtained in this manner. Then a well 4″ deep and 1¼″ in diameter is drilled into the explosive charge by a water flushed drill in a manner familiar to those skilled in the art and a booster explosive of tetryl or similar material pressed to a density of at least 155 g./cc. is inserted in this well. The tetryl booster in turn contains a small well into which is fitted an Engineer Corps Special electric blasting cap or a detonator from a fuze of proper design for the shell. Upon proper initiation of the blasting cap or fuze by techniques well known to those skilled in the art the entire explosive charge detonates with great violence hurling the fragments of the shell outwards with a high velocity and causing great damage to the nearby surroundings by the concussion and blast from the explosion.

This explosive compound is, of course, not limited to use in artillery shells and other explosive military devices. The use of similar charges to destroy trees, stumps, old building structures and to break apart rocks etc. will immediately suggest itself to those skilled in the art. Nor is the usefulness of this compound limited to its pure state. Additives which have been used to enhance or modify the destructive properties of castable explosives may also be used with this compound such as aluminum powder to enhance blast effects, RDX to increase the power and ammonium nitrate to make the composition cheaper. All of these and many more are obvious practical applications of a castable explosive to one skilled in the art.

The guanidine salt of 3,5-dinitro-1,2,4-triazole may also be used in shell casings by press loading in the manner described above and in the same manner as ammonium picrate. This new explosive is stable and sufficiently insensitive to a mechanical blow to enable it to be safely handled in industrial large scale usage.

We claim:
1. 3,5-dinitro 1,2,4-triazole.
2. A compound selected from the group consisting of N-alkyl and N-alkenyl derivatives of 3,5-dinitro 1,2,4-triazole.
3. An N-methyl 3,5-dinitro 1,2,4-triazole having a melting point of 98–98.5° C.
4. A guanidine salt of 3,5-dinitro 1,2,4-triazole.
5. A metal salt of 3,5-dinitro 1,2,4-triazole.
6. The silver salt of 3,5-dinitro 1,2,4-triazole.
7. A method of preparing 3,5-dinitro 1,2,4-triazole which comprises reacting guanazine with a mixture of cupric nitrate and sodium nitrite, subsequently precipitating the 3,5-dinitro 1,2,4-triazole as the silver salt, and recovering 3,5-dinitro 1,2,4-triazole from said silver salt.

No references cited.